C. TAURMAN.
MOTOR FIRE ENGINE.
APPLICATION FILED JUNE 4, 1912.
1,071,275.
Patented Aug. 26, 1913.
4 SHEETS—SHEET 3.
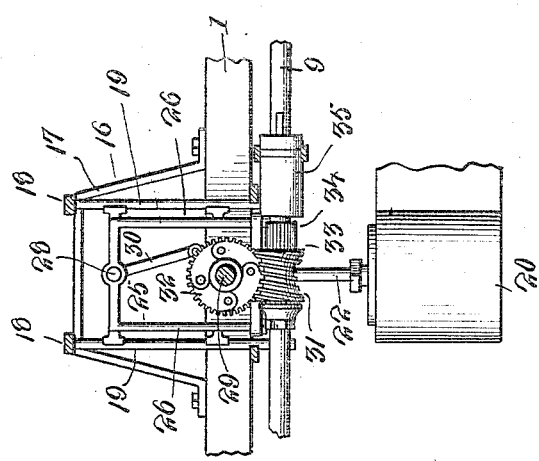
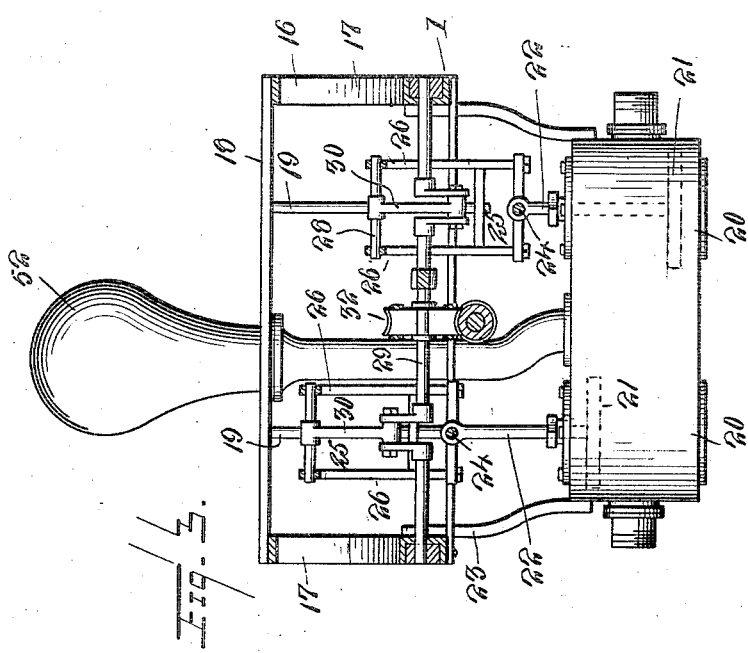
Inventor
Chastian Taurman
Witnesses
E. R. Ruppitt.
John J. McCarthy
By Victor J. Evans
Attorney C. TAURMAN.
MOTOR FIRE ENGINE.
APPLICATION FILED JUNE 4, 1912.
1,071,275.
Patented Aug. 26, 1913.
4 SHEETS—SHEET 4.
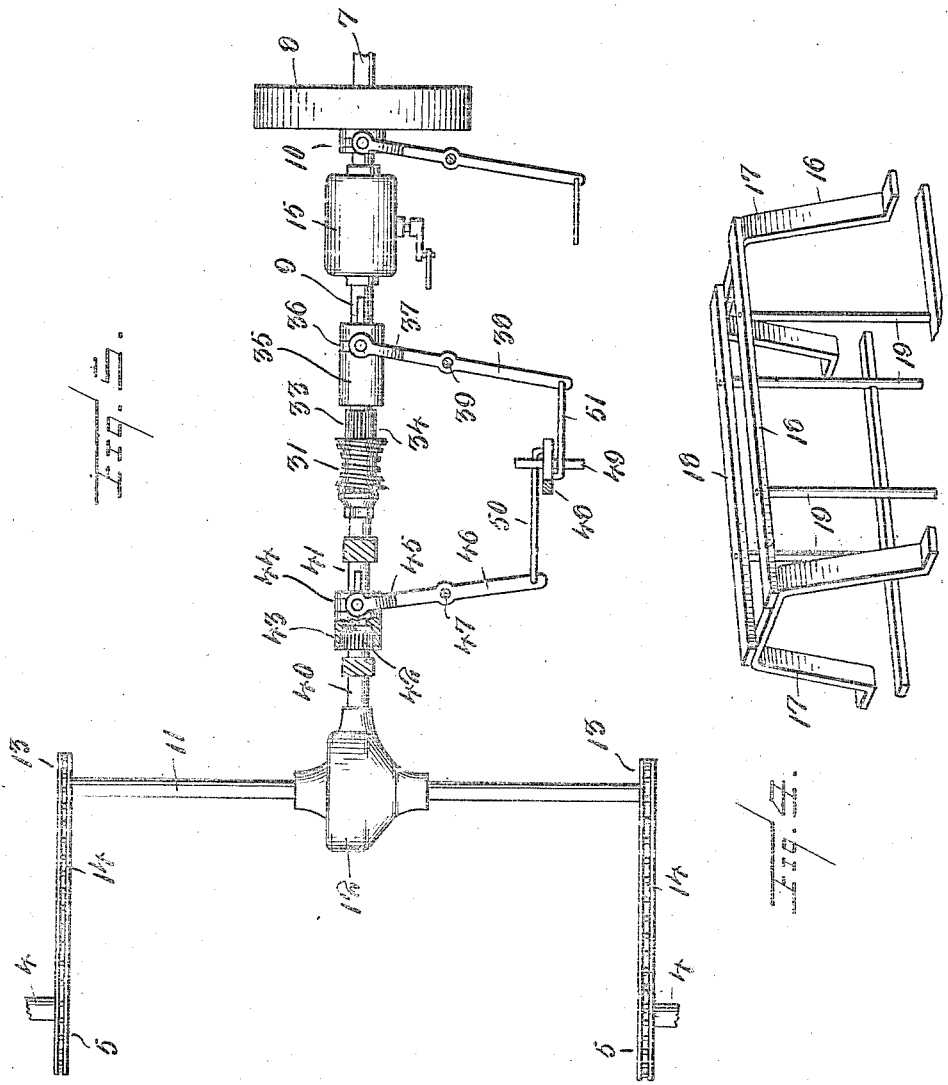
Witnesses
E. P. Ruppert.
John J. McCarthy
Inventor
Chastian Taurman
By Victor J. Evans
Attorney

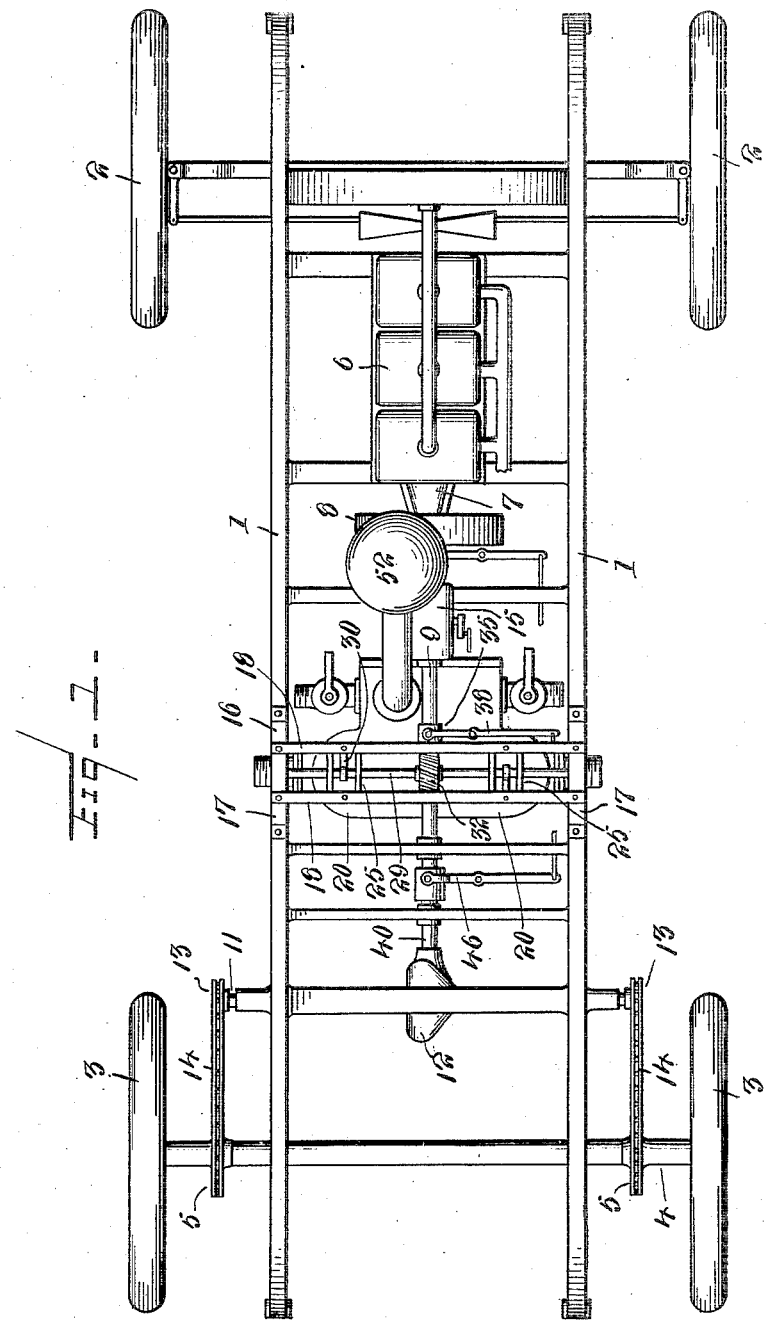

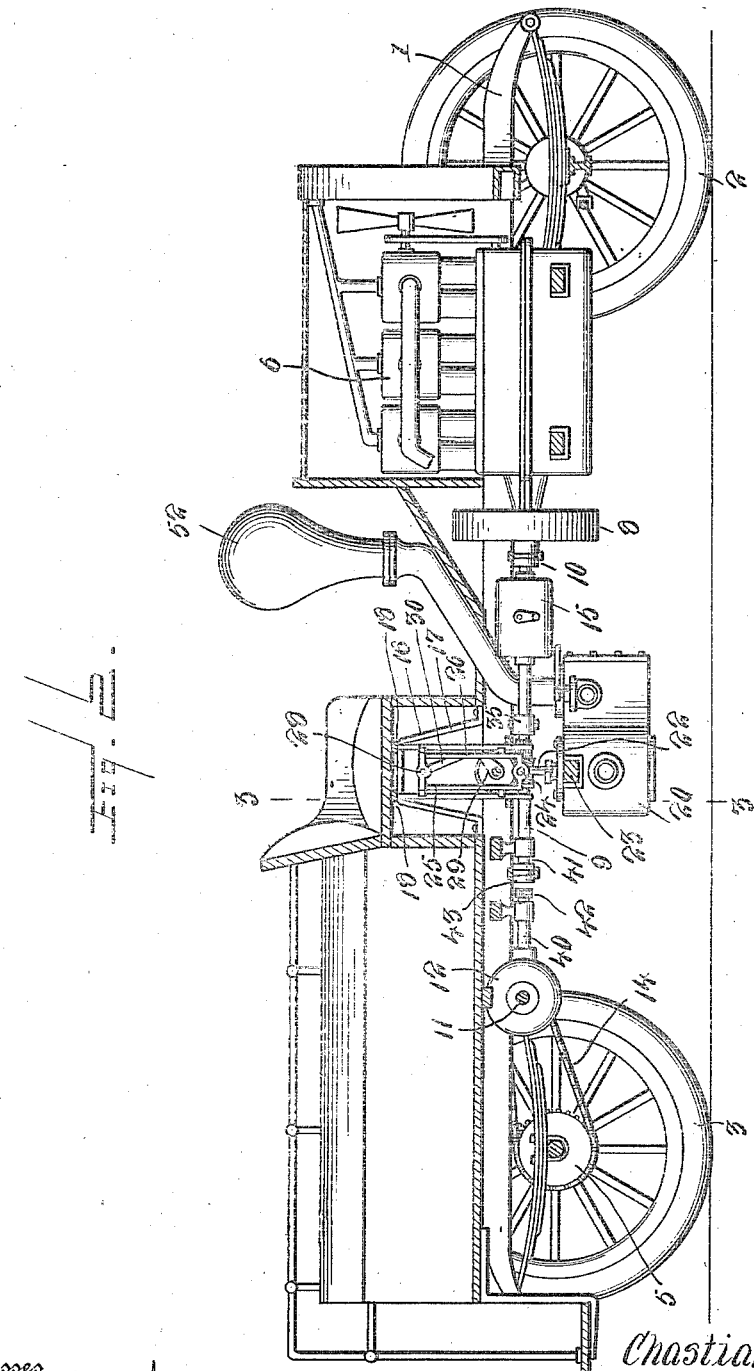

UNITED STATES PATENT OFFICE.

CHASTIAN TAURMAN, OF CINCINNATI, OHIO.

MOTOR FIRE-ENGINE.

1,071,275.   Specification of Letters Patent.   Patented Aug. 26, 1913.

Application filed June 4, 1912. Serial No. 701,603.

*To all whom it may concern:*

Be it known that I, CHASTIAN TAURMAN, a citizen of the United States of America, residing at Cincinnati, in the county of Hamilton and State of Ohio, have invented new and useful Improvements in Motor Fire-Engines, of which the following is a specification.

This invention relates to improvements in motor driven vehicles and has particular application to motor fire engines.

In carrying out the present invention, it is my purpose to provide a motor driven fire engine wherein motion may be transmitted to the driving axle of the vehicle from the driving motor independently of the pump and, conversely, the pump driven from the driving motor independently of the driving axle of the vehicle.

Furthermore, I aim to provide a vehicle of the type above set forth wherein the speed of the pump pistons may be stepped up as the work on the pump increases, incident to the lengthening of the pipe lines and the like.

It is also my purpose to provide a motor driven fire engine wherein the transmission gear system of the driving axle may be employed in imparting motion to the pump from the driving motor of the vehicle independently of the driving axle of such vehicle and wherein the driving axle may receive motion from the driving motor through such transmission gear system independently of the pump, so that the speed of the pump may be stepped up commensurate with the water consumption and without the necessity of employing an additional gear system.

It is also my purpose to provide a motor fire engine wherein in uncoupling the driving axle of the vehicle from the driving motor, the engine will be coupled up to the driving mechanism of the pump and vice versa, uncoupling of the driving mechanism of the pump from the driving motor, the driving axle of the vehicle will be placed in driving engagement with the motor.

The invention has for a still further object the provision of a motor driven fire engine which will embrace the desired features of simplicity, efficiency and durability and which may be operated and maintained at a relatively small cost.

With the above and other objects in view, the invention consists in the construction, combination and arrangement of parts hereinafter set forth in and falling within the scope of the claims.

In the accompanying drawings there has been illustrated one preferred and practical embodiment of my invention, and in these drawings; Figure 1 is a top plan view of a motor fire engine constructed in accordance with the present invention, the body of the vehicle being removed. Fig. 2 is a longitudinal sectional view through the body of the vehicle, parts being shown in elevation. Fig. 3 is a transverse sectional view on the line 3—3 of Fig. 2. Fig. 4 is an enlarged perspective view of the supplemental frame and pump guides. Fig. 5 is an enlarged plan view of the main driving shaft of the vehicle, showing the various clutches for placing the driving axle and pump in and out of engagement with the motor, parts being shown in section. Fig. 6 is a transverse sectional view of the pump crank shaft, a portion of the pump driving mechanism being shown in elevation.

In carrying my invention into practice, I prefer to use a reciprocating pump, and such pump is driven from the main driving shaft of the vehicle preferably by means of a driving mechanism embodying a worm and worm wheel, while the main driving shaft of the vehicle is preferably in the form of two sections coaxial with each other and adapted to be coupled and uncoupled by means of a clutch to place the driving axle of the vehicle in and out of driving engagement with the motor. The driving mechanism of the pump is similarly controlled and I have found it advantageous to so interconnect the clutches as to render one operative while the other is inoperative so that when the pump is performing its duty, the driving axle of the vehicle will be disengaged from the motor and vice versa when the driving axle is operatively coupled up to the motor, the pump will be out of driving engagement therewith.

As my improved motor fire engine is driven by an explosive engine, employing hydrocarbon gas, the speed of the pump has to be stepped up gradually to prevent choking of the engine and consistent with the load of water consumption and to accomplish this stepping up of the speed of the pump I employ the transmission gear system of the vehicle and the vehicle driving axle, according to the conditions prevailing.

Referring now to the accompanying drawings in detail, 1 designates the main frame or chassis of the vehicle carrying at its forward end steering wheels 2, while to the rear end thereof are connected the driving or traction wheels 3 journaled upon the extremities of an axle 4 and equipped with sprocket wheels 5. Mounted upon the forward end of the chassis in any suitable manner is a driving motor 6 preferably in the form of an explosive engine and including the usual crank shaft 7 carrying at one extremity the fly wheel 8. Arranged longitudinally of the main frame or chassis of the vehicle is a main driving shaft 9 coaxial with the engine crank shaft and terminating at one extremity adjacent the fly wheel 8, such extremity of the main driving shaft carrying a clutch 10 of any suitable or preferred construction and adapted to be slid into and out of driving engagement with the crank shaft, the clutch frictionally contacting with the fly wheel to couple the engine and driving shafts, as usual. Any suitable form of clutch may be utilized for this purpose and therefore a detail description of the same is deemed unnecessary for the purposes of this invention. The opposite extremity of the driving shaft 9 is operatively connected with a driving axle or shaft 11 through the medium of the usual differential gear 12. This driving axle 11 is arranged transversely of the main frame or chassis of the vehicle and at right angles to the main driving shaft thereof and is equipped at each end with a sprocket wheel 13 over which and the respective sprocket wheel 5 of the traction wheels are trained endless chains 14. Thus, it will be seen that when the driving motor of the vehicle is in operation, motion will be transmitted to the main driving shaft 9 by way of the clutch 10 and fly wheel 8, thence to the driving axle or shaft 11 and traction wheels 3 with the effect to propel the vehicle.

The variable speed transmission gear system of the vehicle is indicated at 15 and in accordance with the present arrangement of the various parts of the vehicle is located immediately adjacent the clutch 10, the main driving shaft 9 of the vehicle being connected to this transmission gear system in the ordinary well known manner, and as this transmission gear system may be of any preferred or selected form, a detail description of the same is not here given.

Mounted upon the main frame 1 of the vehicle, a suitable distance beyond the driving motor, is a supplemental frame 16 arranged transversely of the main frame or chassis and composed, in the present instance, of diverging side braces 17, 17 and cross bars 18, 18 interconnecting the side braces and held spaced from the main frame by such braces. This supplemental frame is adapted to support the seat of the operator in control of the vehicle, and depending from the cross bars 18, 18 of the frame, are spaced parallel guides or track ways 19, 19 of any suitable or preferred construction.

As before stated, the pump is preferably of the reciprocating type and in the present instance is composed of a pair of cylinders 20, 20 in each of which is mounted for reciprocation a piston 21 provided with a piston rod 22 projecting outwardly of the upper end of the respective cylinder. These cylinders are preferably beneath the main driving shaft 9 of the vehicle and held in place by means of suspension brackets 23 bolted or otherwise secured to the main frame of the vehicle. The free extremity of each piston rod 22 is connected to the lower interconnecting bar 24 of a cross head 25 including spaced parallel side bars 26, 26 interconnected at their lower extremities and fastened to the bar 24, and connected at their upper extremities, a wrist pin 28 being connected to the upper extremities of the bars 26, 26. These cross heads 25 are mounted for sliding movement within the guides or track ways 19, 19 and are designed to be reciprocated to impart movement to the pump pistons so that the pump may perform its duty when operatively connected to the motor.

The crank shaft of the pump is indicated at 29 and as shown is arranged transversely of the main frame of the vehicle and located an appropriate distance above the main driving shaft 9 of the vehicle and to the crank portions thereof are connected pitmen or driving rods 30, 30 each having connection with one of the wrist pins 28. Thus, when the crank shaft 29 of the pump is rotated, the pitmen or driving rods 30 will be reciprocated with the effect to transmit a similar movement to the cross heads within the guides so as to impart a reciprocatory movement to the pump pistons.

The driving mechanism of the pump is preferably in the form of a worm and worm gear and comprises the worm 31 loosely encircling the drive shaft 9 and held against longitudinal movement thereon, and worm wheel 32 keyed to the crank shaft of the pump between the sliding cross heads and in mesh with the worm on the vehicle driving shaft. This worm 31 is adapted to be placed in and out of driving engagement with the main driving shaft 9 of the vehicle and for this purpose is equipped at one extremity with a reduced collar 33 provided with a toothed surface 34 adapted to be engaged by a sliding collar 35 having a toothed surface adjacent the toothed surface 34 of the collar 33 and provided with a circumferential groove 36 receiving a yoke 37 carried upon one extremity of an operating lever 38 pivoted as at 39 to an appropriate part of the vehicle frame. The collars 33 and 35 form a clutch and when the collar 35 is slid into engagement with the collar 33, the teeth of the collars interlock to place the worm 31 in driving engagement with the driving shaft, the collar 35 being splined to the driving shaft for sliding movement to accomplish this result.

In order to disconnect the driving shaft or axle 11 of the vehicle from the main driving shaft 9 when the pump is clutched up to the main driving shaft, I form such main driving shaft of two sections 40 and 41 coaxial with each other and equipped with a clutch, one member 42 of which clutch is keyed to the section 40 of the shaft, while the opposite member 43 of the clutch is splined to the section 41 of the main driving shaft for sliding movement and formed with a circumferential groove 44 in which is disposed a yoke 45 connected to an operating lever 46 pivoted as at 47, the clutch members 42 and 43, having their proximate surfaces toothed so that when the clutch members are engaged with each other, the teeth will interlock with the effect to drive the section 40 from the section 41.

The operating levers 38 and 46 of the respective clutches, are controlled from a common lever located within convenient reach of the operator upon the seat of the vehicle and designed, when moved in one direction, to disconnect the clutch of the pump driving mechanism from the shaft and connect the clutch of the vehicle driving mechanism to the shaft and when moved in the opposite direction to disconnect the clutch of the vehicle driving mechanism and connect the clutch of the pump driving mechanism. This common clutch throwing lever is indicated at 48 and is pivoted as at 49 to an appropriate part of the vehicle and has connected thereto at one side of its pivotal connection with the vehicle, a link 50 connected to the operating lever 46, and upon the opposite side of the pivotal connection with the vehicle frame, a link 51 connected to the operating lever 38.

The worm wheel 32 is preferably composed of a plurality of sections, as shown in Fig. 6 which are bolted or otherwise secured in wheel formation, so that the worm wheel may be removed from the crank shaft of the pump when desired.

The air dome of the pump is indicated at 52 and as shown is preferably disposed adjacent the foot board of the vehicle and in proximity to the operator's seat.

From the foregoing description taken in connection with the accompanying drawings, the construction and mode of operation of my invention will be readily apparent.

Assuming the clutch throwing lever 48 to be in the position shown in Fig. 5, the driving motor of the vehicle will be connected up to the driving axle 11 through the medium of the clutch 10, main driving shaft 7 and differential 12, the clutch composed of the members 42 and 43 coupling the sections 40 and 41 of the main driving shaft to propel the vehicle. Should it be desired to couple the pump to the driving motor, the lever 48 is thrown with the effect to uncouple the sections 40 and 41 from each other and place the clutch member 35 in engagement with the clutch member 33 whereby the worm 31 will be keyed to the section 41 of the main driving shaft with the effect to rotate the crank shaft 29 of the pump and slide the cross heads 26 within the respective guides and so reciprocate the pistons of the pump.

It will be noted that the traction wheels of the vehicle may be disconnected from the driving motor and the pump placed in driving engagement therewith without stopping the motor or disengaging the clutch 10 from the fly wheel, 8 and furthermore, it will be seen that the above operation will be accomplished by a single lever and without the use of a plurality of clutch throwing devices. Further, it will be seen that the speed of the pump may be stepped up in accordance with the conditions prevailing through the medium of the transmission gear system of the vehicle thereby eliminating the employment of an additional variable speed gear system.

While I have herein shown and described one particular embodiment of my invention by way of illustration, it is to be understood that I do not limit or confine myself to the precise details of construction herein described and delineated, as modification and variation may be made within the scope of the claims and without departing from the spirit of the invention.

I claim:

1. In a motor fire engine, the combination of a driving motor, a main drive shaft comprising two axially alining sections, a wheel driving shaft, a clutch for placing one of the sections of the main drive shaft in and out of driving engagement with the motor, a second clutch for placing the sections of the main drive shaft in and out of driving engagement with each other whereby power may be imparted to and removed from the wheel driving shaft, a pump, a driving mechanism for the pump operable from the first-mentioned section of the main drive shaft, and means for placing the driving mechanism of the pump in and out of driving engagement with the respective section of the main drive shaft and for coupling and uncoupling the sections of said main drive shaft.

2. In a motor fire engine, the combination of a driving motor, a main drive shaft comprising two axially alining sections, a wheel driving shaft operable from one of said sections, a clutch for placing the other section in and out of driving engagement with said motor, a pump, a driving shaft for the pump, a clutch for connecting the pump to the last-mentioned section of said main drive shaft and for disconnecting the pump therefrom, and means for operating the clutch controlling the sections of the main drive shaft and the pump clutch simultaneously.

In testimony whereof I affix my signature in presence of two witnesses.

CHASTIAN TAURMAN.

Witnesses:
    HENRY G. HAUCK,
    A. A. DEGENHART.